United States Patent [19]

Nozawa

[11] 4,209,944
[45] Jul. 1, 1980

[54] METHOD OF HYDROPONIC CULTURE

[75] Inventor: Shigeo Nozawa, Hyogo, Japan

[73] Assignee: Kyowa Kagakukogyo Kabushiki Kaisha, Osaka, Japan

[21] Appl. No.: 947,842

[22] Filed: Sep. 29, 1978

[30] Foreign Application Priority Data

Dec. 16, 1977 [JP] Japan ................................ 52-152231

[51] Int. Cl.² .......................................... A01G 31/02
[52] U.S. Cl. ............................................... 47/59
[58] Field of Search .................................. 47/59–65, 47/17

[56] References Cited

U.S. PATENT DOCUMENTS

| | | | |
|---|---|---|---|
| 3,925,926 | 12/1975 | Nozawa | 47/62 |
| 4,149,970 | 4/1979 | Atkins et al. | 47/62 X |

*Primary Examiner*—Robert E. Bagwill
*Attorney, Agent, or Firm*—Mason, Fenwick & Lawrence

[57] ABSTRACT

A method of hydroponic culture in which plants are cultured while a nutrient solution is continuously circulated within a culture tank. The method comprises determining a scheduled growth curve for a plant to be cultured, programming the flow rate increase and liquid level drop of the nutrient solution by approximate correspondence with the scheduled growth curve, and supplying the nutrient solution under control in accordance with the program.

7 Claims, 7 Drawing Figures

METHOD OF HYDROPONIC CULTURE

BACKGROUND OF THE INVENTION

The present invention relates to a method of hydroponic culture in which plants are grown while a nutrient solution is continuously circulated within a culture tank. The invention provides a method of accelerating the growth of plants and increasing the yield by leaps and bounds.

What should be mentioned first is that the high rate of growth and high yield achieved by the method of the present invention are much greater than those achieved by the usual soil culture and hydroponic culture which have heretofore been practiced in various ways.

Generally, in soil culture, the growth of plants is governed by a combination of many environmental factors, such as the amount of sunshine, temperature, $CO_2$ concentration, wind velocity, humidity, the proportion and concentration of fertilizer, and the nature, water content and pH of soil. Further, whether the growth of plants is good or bad is determined by the complex physiological mechanism of plants as the ground and underground environments for growth of plants are organically interrelated. In reality, however, the study of the underground environment of the roots of plants is not yet sufficient and the underground environment cannot be freely controlled. Therefore, it may be said that the organic control of the ground and underground environments, or the overall environment, of plants is impossible at present. The trend of growth of plants which we believe we have a general knowledge of is, in fact, the result of our observation of the growth of plants carried out under conditions greatly limited by insufficient environment for the growth of plants or under conditions where the substance producing inherent ability of plants has not yet been fully developed. However, this important fact has not yet been fully understood and, therefore, there is apt to be a mistaken belief that there is no possibility of accelerating the growth of plants by leaps and bounds.

Even if the full control of said environment for growth of plants is impossible, it is not impossible to bring about a surprising result of growth if those of the various environmental factors affecting the growth of plants which are governing factors, and their mutual actions affecting the growth of plants are clarified to the extent that the governing factors can be improved or controlled.

Now, the problem is what factors are important. In this connection, I have conducted various tests on hydroponic culture and found that the controlled flow rate of nutrient solutions and controlled liquid level with respect to the roots of plants are very important factors throughout the overall period of growth of plants. This means that it is important to make a series of coordinated controlled supplies of a nutrient solution in association with the development of the growing roots and ground portions throughout the overall period of culture extending from germination to harvest rather than giving good environment in a single period or fragmentarily in the course of growth of plants, thereby maintaining such a condition as will allow the roots to develop their functions to the fullest extent.

Plants absorb oxygen, water and nutrients from their roots and send them to the stalks and leaves in the ground region to effect photosynthesis in the ground region by using solar energy and oxygen monoxide. If, however, water necessary for physiological purposes, nutrients necessary for growth and oxygen necessary for respiration of root cells which affects the water and nutrient absorbing function cannot be sufficiently taken in, then the growth of plants cannot but be limited since the absorption of water and nutrients is insufficient even if there is sufficient sunlight in the ground region. This means that usually, almost all plants which seem to be favorably growing are, in fact, under many limitations described above and that, as a result, the efficiency of utilization of solar energy is very low.

On the other hand, the amount of all substance in a plant at any instant is the cumulative amount of growth of the plant at that instant, while the amount of growth at any instant is dependent on the growth ability at an instant just before that instant. In other words, it may be said that growth brings about growth. Therefore, the degradation of the root system, i.e., the lowering of the physiological activity, results in a rate-determining factor which degrades the subsequent growth.

SUMMARY OF THE INVENTION

From my various tests on the underground environment and on the physiology of plants, I have found that in order to achieve the activation and sustainment of the essential physiological functions of roots (i.e., the sufficient ability of roots to respirate and their high ability to absorb water and nutrients), the overall control, in terms of contents and period, of the rate of flow of nutrient solutions and liquid level are most important. Of course, it has heretofore been practiced to flow nutrient solutions into a culture tank and change the liquid level several times. However, such procedures are individual or temporary, which means that it is not recognized that the composite control of the flow rate and liquid level on the basis of a definite theory and system as in the present invention is a factor which will bring about a greater growth result. In fact, such control has not been practiced.

The present invention makes it a basic requirement that in hydroponic culture the flow rate and the level of a nutrient solution in a culture tank should be continuously or stepwise changed according to the growth of plants being cultured. More particularly, in the static water, even if there are sufficient oxygen and nutrient ions around the roots at the start, the absorption of them from the surfaces of the roots will result in the subsequent absorption thereof being governed by the rate of dissipation of oxygen and nutrient ions in the water, so that there will be a shortage thereof if the amount of absorption increases. Further, even if the nutrient solution is in a flowing state, a constant rate of flow would, before long, result in said shortage with respect to the increasing amount of respiration and the required amount of absorption of nutrient by the plants as the latter grow, thus causing growth suppression and a physiological impediment, which form a major cause of a drop in the possible amount of growth. In other words, it is necessary that such a flow rate be given to the nutrient solution as will artificially increase the frequency of contact of oxygen and nutrient ions with the roots and that this flow rate be increased during all period of growth or at least from germination to the initial stage of growth in accord with the amount of growth of plants. Also, what is important in conjunction with said control of flow rate is the control of liquid level. The control of flow rate and the control of liquid level must be concurrently achieved in connection with each other. Originally, the dissolved oxygen in the water is very small in amount as compared with the oxygen in the air, and with this dissolved oxygen, it is impossible to give a sufficient supply of oxygen needed for the growth of plants. Therefore, in order to allow plants to absorb sufficient oxygen from the air as the amount of growth increases, it is necessary that as the plants grow, the liquid level be lowered so that the exposed roots can absorb the abundant oxygen in the air. If this control of the liquid level corresponding with the increasing amount of growth is insufficient, this will result in insufficient absorption of oxygen by the roots, causing a lowering of physiological activity, which causes a lowering of the function of the roots of absorbing water and nutrients. The extent of the control of liquid level is such that the surfaces of the roots exposed to the air will not dry. The oxygen in the air can be efficiently absorbed through a thin layer of water on the epidermal cells, and it becomes necessary to progressively reduce the liquid level such that the roots in the water can absorb water, nutrients or oxygen in the nutrient solution without hindrance, in consideration of the amount of growth of plants and the thickly grown state of the root system. Thus, the basic concept of the present invention is to deliberately and continuously control the flow rate and level of the nutrient solution with respect to the increasing amount of absorption by the roots as the plants grow, thereby allowing the plants to develop their nutrient absorbing function to the fullest extent. Although it is most preferable to effect this control of the flow rate and liquid level continuously from germination to harvest time in order to stabilize the physical state of plants and allow them to fully develop their function, it is necessary to effect said control at least from germination to the initial stage of growth of plants. More important is the composite control of the ever increasing flow rate and the ever decreasing liquid level. This composite control is determined by preparing a peculiar scheduled growth curve with consideration given to the growth trend corresponding with the weather conditions of the particular region to lay out a program so that the flow rate will increase and the liquid level will decrease in accord with said scheduled growth curve. The scheduled growth curve is a curve indicating the amount of growth corresponding with the number of days of growth of plants in that region but is different from the generally indicated curve of plants in the conventional soil culture and hydroponic culture. This scheduled growth curve can be determined by the kind of plants, culture season, weather conditions, etc. In marking this determination, an expectable amount of enhanced growth is calculated on the basis of the conventional general growth curve for the plant in question with the number of days plotted on the horizontal axis and the amount of growth on the vertical axis, said curve being modified by using said calculated value as a coefficient of compensation, thereby providing a scheduled growth curve. This scheduled growth curve can be corrected to a more ideal growth curve by taking into consideration a growth curve which will be obtained in actual culture by the method of the present invention using said scheduled growth curve.

The amount of growth of the plant as a factor which determines the scheduled growth curve can be measured with one or more of such factors as the raw weight, dry weight, leaf area, amount of nutrients absorbed by the root, and amount of carbon dioxide absorbed.

With said scheduled growth curve used as the basis, the nutrient-solution increase and liquid-level drop are programed to approximate to said curve. As for the flow rate and the liquid level of the nutrient solution with respect to the scheduled growth curve, since the amount of growth may be regarded as zero until germination, if the flow rate increase curve is so determined as to approximate to said scheduled growth curve with the flow rate starting at a zero or nearly zero value, the controllable range can be conveniently enlarged. Further, the liquid level may be determined so that it is decreased from the initial liquid level (which is the distance from the bottom of the culture tank to the lower surface of the seed) as said scheduled growth curve increases. This liquid-level drop will assume a much more gentle curve than the flow rate increase curve since it is only necessary to assure that the oxygen in the air which is much higher in concentration than the oxygen in the water is fully absorbed by the root.

The present invention provides a culture method wherein the flow rate and the liquid level of a nutrient solution determined in the manner described above are program-controlled continuously or stepwise for the overall culture period from germination to harvest time or at least for a portion of said period from germination to the initial stage of culture.

It is most preferable to perform the method of the invention for the overall culture period. The growth of plants in the latter period is greatly influenced by the environment for the seedlings in the initial stage of culture. The seedlings cultured from germination to the middle stage of culture by the method of the invention will satisfactorily grow to give an increased yield even if placed in the environment for culture by the conventional method. In some cases, by controlling the middle or final stage of growth by the method of invention, it is possible to divert the assimilated substance to the fruit and decelerate aging so as to achieve an increased yield.

As for the control of liquid level and flow rate, stepless continuous control is most preferable but even if it is stepwise varied the object can be achieved to some extent.

DESCRIPTION OF THE PREFERRED EMBODIMENTS

Test results according to the method of the invention will now be described.

Test I: Culture of Melons

Figure 1:
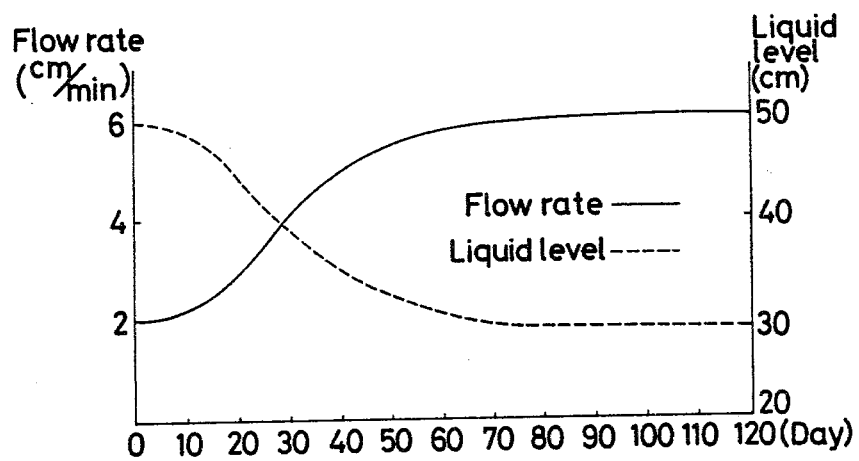
FIG. 1 is a graph showing the flow rate and liquid level of a nutrient solution in Test I.
Figure 2:
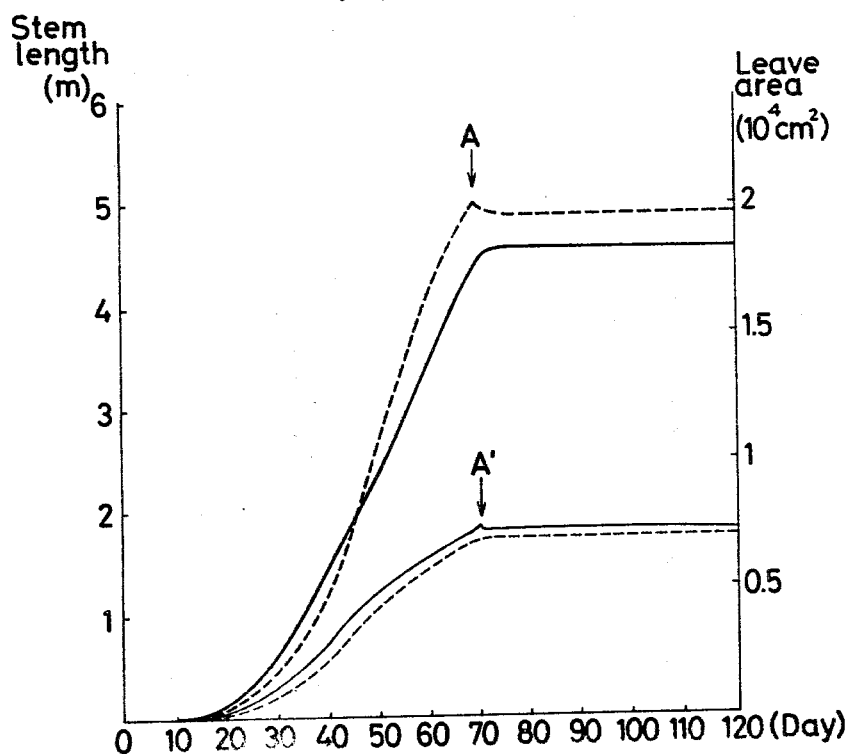
FIG. 2 is a graph showing a growth curve of melons in Test I.
Figure 3:
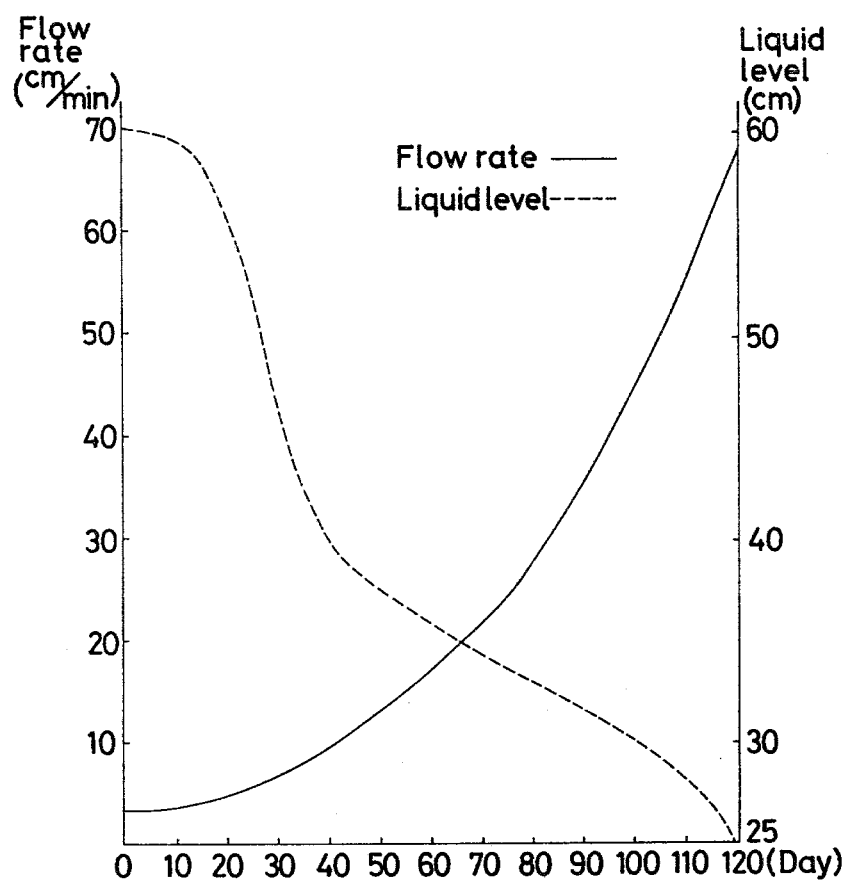
FIG. 3 is a graph showing the flow rate and liquid level of a nutrient solution in Test II.

Melons of the variety Earl's Favourite were cultured by the culture method of the present invention. FIG. 1 shows the adopted flow rate and liquid level of the nutrient solution. The flow rate (cm/min) and the liquid level (cm) are plotted on the vertical axis and the number of days after sowing is plotted on the horizontal axis, the flow rate being indicated in a solid line and the liquid level in a broken line. The initial flow rate is 2 cm/min and the initial liquid level is 50 cm, which is such that the water touches the bottoms of the seeds. FIG. 2 is a graph showing the growth curve of melons cultured with the flow rate and liquid level shown in FIG. 1, the stem length (in meters) and the leaf area (in $10^4$ cm$^2$) being plotted on the vertical axis and the number of days after sown being plotted on the horizontal axis. The curve in a thick solid line is a stem length increase curve according to the method of the present invention, and the curve in a thick broken line is a leaf area increase curve according to the method of the present invention. Indicated by a thin solid line and by a thick broken line are a stem length increase curve, respectively, according to the conventional general hydroponic culture. In addition, polling was effected at points of time marked A and A'. The stem length was limited by polling to about three times the height of a man, and it will be seen that abundant melon fruit is produced. Melons of the variety Earl's Favourite are a special expensive crop and the culture thereof requires rich experience and careful culture control. In the conventional soil and hydroponic cultures of such melons in Japan, the plants are polled at a stem length of about 1.5 m and 1 melon is yielded per plant 110–120 days after sowing, which has been the limit in order to achieve the intended quality. With the culture method of the invention, the growth is very fast, with polling effected at a stem length of about 4.6 m, yielding 8 melons per plant 110–120 days sowing. The result of the culture is shown in Table 1 together with the result of the conventional culture.

Table 1

| | Comparative Table of Result of Culture of Melons (per plant) | | | | |
|---|---|---|---|---|---|
| | Number of days needed for harvest | Stem length (m) | Sugar percentage (Brix) | Weight of each melon (kg) | Number of melons harvested | Total weight harvested (kg) |
| Present inventive method | 118 | 4.6 | 13–15 | 1.6 | 8 | 13.0 |
| Conventional method (hydroponic) | 115 | 1.5 | 13 | 1.5 | 1 | 1.5 |

As is apparent from the above test result, the fact that exceptionaly high growth rate and 8-fold yield were possible in almost the same period of culture means that the method of the present invention makes possible the maintenance and enchancement of the high physiological activity of plants and that a large amount of assimilated product concomitant of the resulting rapid increase in the leaf area contributed to the sharp increase in yield. In addition, although the flow rate increase curve shown in FIG. 1 is relatively gentle, the actual growth curve shown in FIG. 2 has been thereby obtained; and therefore, this fact shows the possibility that better growth can be achieved by making the nutrient solution flow rate increase curve shown in FIG. 1 more approximate to the ideal one on the basis of the actual growth curve shown in FIG. 2.

Test II: Let-Alone Culture of Cucumbers

Cucumbers were cultured by the method of the present invention on a let-alone basis without pruning, with the plants allowed to freely trail on a net spread a suitable height above the ground. Different beds, each 1 m×3 m, were allotted to different numbers of plants; 4 plants, 3 plants, 2 plants and 1 plant per bed, respectively.

Figure 4:
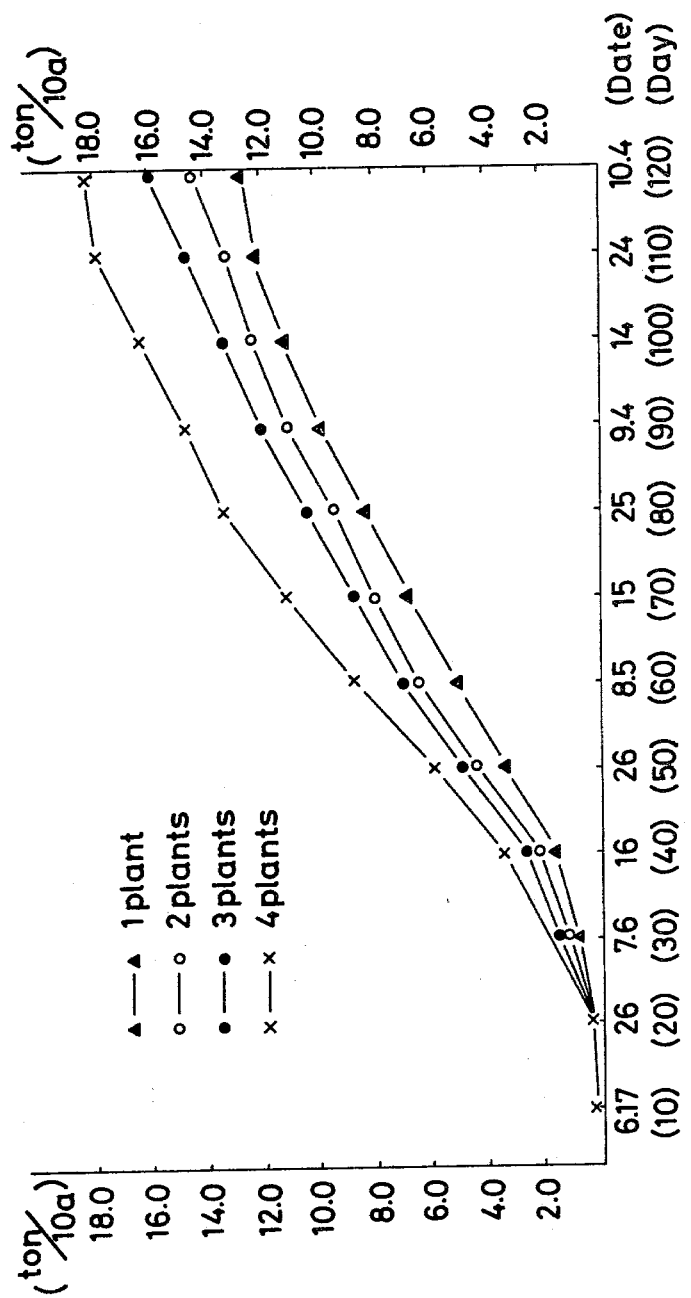
FIGS. 4 and 5 are graphs showing the yield of cucumbers in Test II.

FIG. 4 shows curves for the flow rate and liquid level of the nutrient solution in this test. The flow rate (cm/min) and liquid level (cm) are plotted on the vertical axis and the number of days after sowing is plotted on the horizontal axis, the flow rate being indicated by a solid line and the liquid level by a broken line. The initial flow rate is 2 cm/min and the initial liquid level is 60 cm, which is such that the water touches the bottoms of the seeds.

Figure 5:
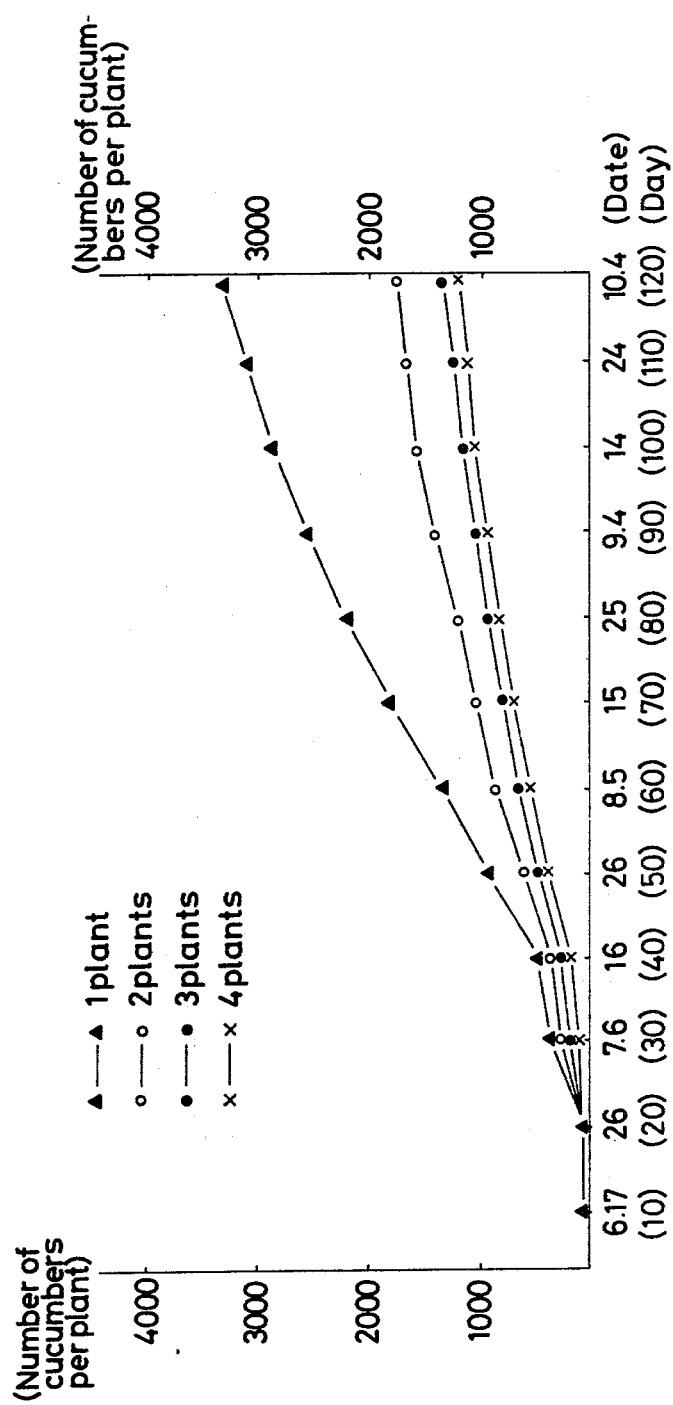

FIG. 5 shows time-dependent changes in yield per 10 ares. The yield in tons per 10 ares in plotted on the vertical axis and the date (with the number of days after the start of harvest enclosed in parentheses) is plotted on the horizontal axis. In this group, the mark ▲ indicates the yield for 1 plant in the bed, the mark ○ the yield for 2 plants in the bed, the mark ● the yield for 3 plants in the bed and the mark X the yield for 4 plants in the bed.

Table 2 shows the yield of cucumbers according to the method of the present invention in comparison with that according to the conventional method. The yield in the invention is the value for 4 plants per bed (1 m×3 m) while the yield in the conventional method is the general value for the conventional soil culture (greenhouse culture). Said value is approximately the same as that for the conventional hydroponic culture. In addition, in the case of said conventional method, the number of cucumber plants per bed (1 m×3 m) is about 12–15 and the number of plants per 10 ares is about 2,000. The yield is expressed in tons per 10 ares.

Table 2

| | Comparative Table of Yield of Cucumbers (per 10 ares) | | | | |
|---|---|---|---|---|---|
| | Monthly yield for 120 days after the start of harvest (ton/ 10 a) | | | | |
| | 1st–30th day | 31st–60th day | 61st–90th day | 91st–120th day | Total |
| Present invention (4 plants/bed) | 1.8 | 7.3 | 5.9 | 3.8 | 18.8 |
| Conventional soil culture (12–15 plants/bed) | 2.0 | 3.0 | 3.5 | 1.5 | 10.0 |

Figure 6:
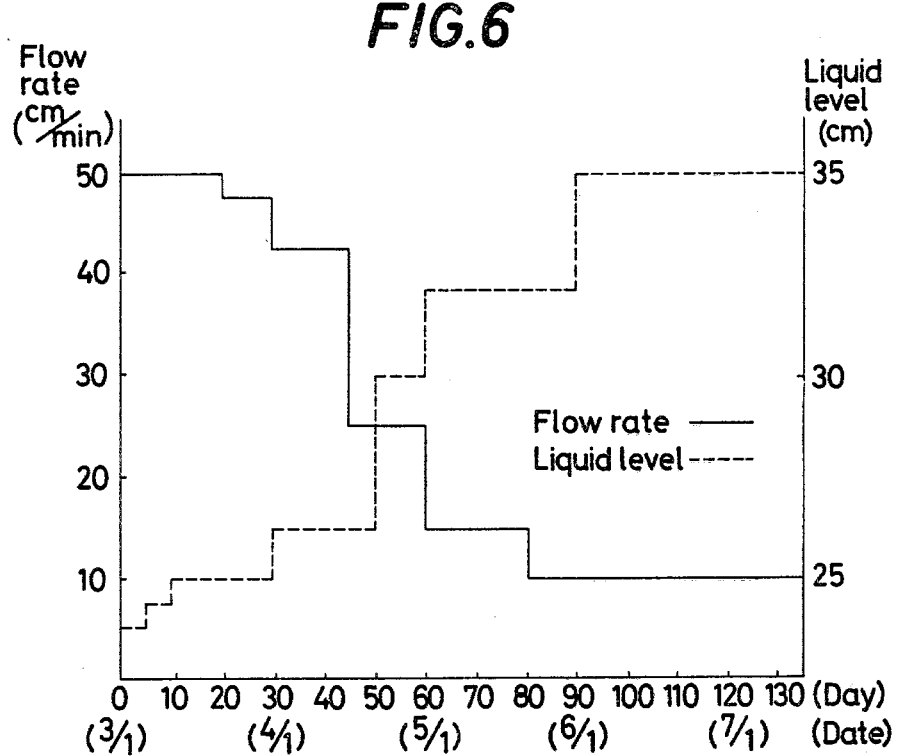
FIG. 6 is a graph showing the flow rate and liquid level of a nutrient solution in Test III.
Figure 7:
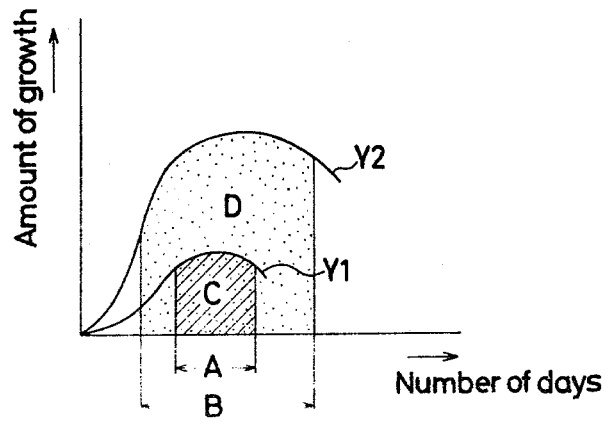
FIG. 7 is a graph showing the general difference in yield between the present invention and the conventional method.

FIG. 6 shows time-dependent changes in the number of cucumbers harvested per plant. The number of cucumbers harvested per plant is plotted on the vertical axis, and the date is indicated on the horizontal axis. (The figures in parentheses are the number of days after the start of harvest.) In FIG. 6, the mark ▲ indicates the number of cucumbers harvested per plant when 1 plant was cultured per bed (1 m×3 m), the mark ○ indicates the number of cucumbers harvested per plant when 2 plants were cultured per bed, the mark ● indicates the number of cucumbers harvested per plant when 3 plants were cultured per bed, and the mark X indicates the number of cucumbers harvested per plant when 4 plants were cultured per bed. In addition, in the conventional soil or hydroponic culture, the number of cucumbers harvested per plant is about 20–50.

As is apparent from the above test results, according to the method of the present invention, for example, the culture of 4 plants per bed gives twice the conventional yield and this suggests the possibility that if the number of plants to be cultured per bed is suitably varied the yield can be further increased. Further, according to the invention, the number of cucumbers obtainable per plant exeeds 3,000, which would be unconceivable from the conventional number, which is about 50. What is worthy of special mention is that whereas the culture of cucumbers in this test was carried out on a let-alone basis without pruning, the current culture species, such as tomatoes, cucumbers and melons, if cultured left as they grow, without pruning, in the conventional technique, would give almost no yield.

Test III. Culture of Tomatoes

Spring-sown tomatoes were cultured by the method of the invention. FIG. 8 shows the flow rate and liquid level of the nutrient solution in this test. The flow rate and liquid level were stepwise controlled in this test. The flow rate (cm/min) and liquid level (cm) are plotted on the vertical axis and the number of days after sowing (with the date enclosed in parentheses) is plotted on the horizontal axis, the flow rate and liquid level being shown in solid and broken lines, respectively.

Table 3 shows the result of yield of tomatoes in this test in comparison with the conventional culture. In addition, the culture according to the invention and the conventional hydroponic culture were both greenhouse culture, but the conventional soil culture was outdoor culture.

Table 3

Comparative Table of Result of Culture of Tomatoes

|  | Sown | Number of plants cultured (per 10 ares) | Period of yield | Yield (tons/10 ares) |
|---|---|---|---|---|
| Present inventive method (in greenhouse) | Mar. 1 | 1,080 | 75 days | 16.1 |
| Conventional soil culture (outdoors) | Mar. 1 | 2,000 | 75 days | 3.6 |
| Conventional hydroponic culture (in greenhouse) | Mar. 1 | 2,000 | 75 days | 8 |

As is apparent from Table 3, the conventional soil culture is outdoor culture and the fact that the present inventive culture and the conventional hydroponic culture and greenhouse culture is advantageous over said soil culture, but the culture according to the present invention gives an increased yield which is 4.5 times the yield for the conventional soil culture and twice the yield for the conventional hydroponic culture. Moreover, when considered from the fact that the number of plants cultured in the present invention is only half of that for said soil and hydroponic cultures, the above difference in yield is a fact which deserves attention.

The remarkable result of yield clarified by the tests described above is due solely to the fact that the culture method of the present invention greatly increases the amount of growth of plants from very early stage of culture and enables them to maintain their high productive power for a long time without aging. To describe this in more detail, in FIG. 9, let Y1 be the growth curve according to the conventional method, then the growth curve according to the invention is as indicated by the reference character Y2 which indicates that the growth is very rapid from the early stage of culture and that aging is retarded. The period of harvest in this case is indicated by the mark A for the conventional method and the mark B for the present invention which indicates that early harvest is possible and that the productive power is maintained for a long time. Therefore, the difference in yield between the present invention and the conventional method is proportional to the difference between the slant-lined area marked C and the dotted area marked D, said difference in area, in fact, appearing as the drastic difference in yield described above.

What is claimed is:

1. A method of hydroponic culture in which plants are cultured while a nutrient solution is continuously circulated within a culture tank, said method being characterized by determining a scheduled growth curve for a plant to be cultured, programing the flow rate increase and liquid level drop of the nutrient solution by approximate correspondence with said scheduled growth curve, and supplying the nutrient solution under control in accordance with said program.

2. A method of hydroponic culture as set forth in claim 1, wherein the increase of the flow rate of the nutrient solution is effected continuously.

3. A method of hydroponic culture as set forth in claim 1, wherein the increase of the flow rate of the nutrient solution is effected stepwise.

4. A method of hydroponic culture as set forth in any one of claims 1–3, wherein the liquid level drop of the nutrient solution is effected continuously.

5. A method of hydroponic culture as set forth in any one of claims 1–3, wherein the liquid level drop of the nutrient solution is effected stepwise.

6. A method of hydroponic culture as set forth in claim 5, wherein the controlled supply of nutrient solution is effected throughout the overall period of culture.

7. A method of hydroponic culture as set forth in claim 5, wherein the controlled supply of nutrient solution is effected for a period extending from germination to at least the early stage of culture.

* * * * *